Oct. 21, 1947.    L. T. SACHTLEBEN    2,429,331
PHOTOELECTRIC APPARATUS FOR INSPECTION OF A PAPER STRIP
Filed Dec. 8, 1943
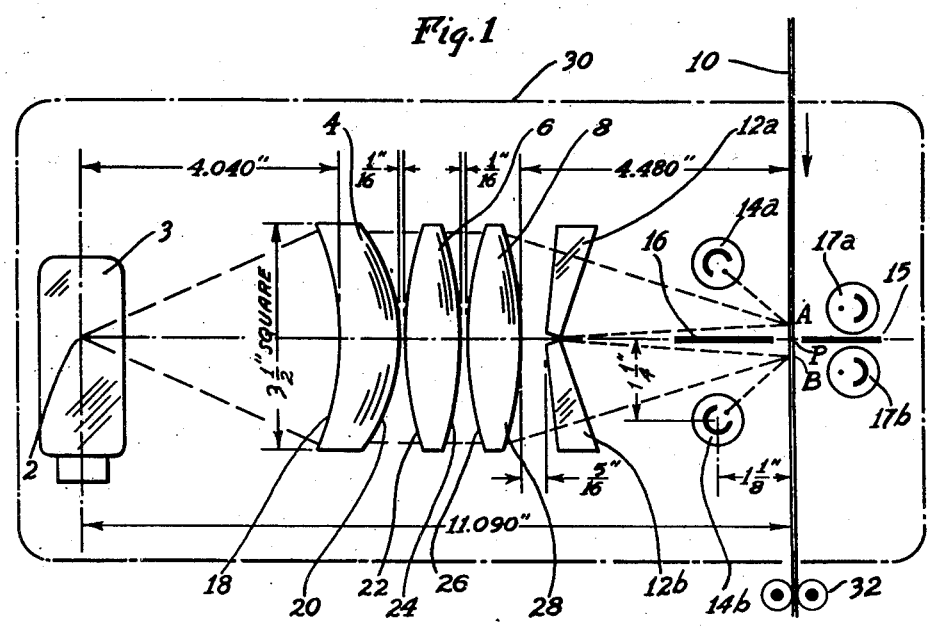
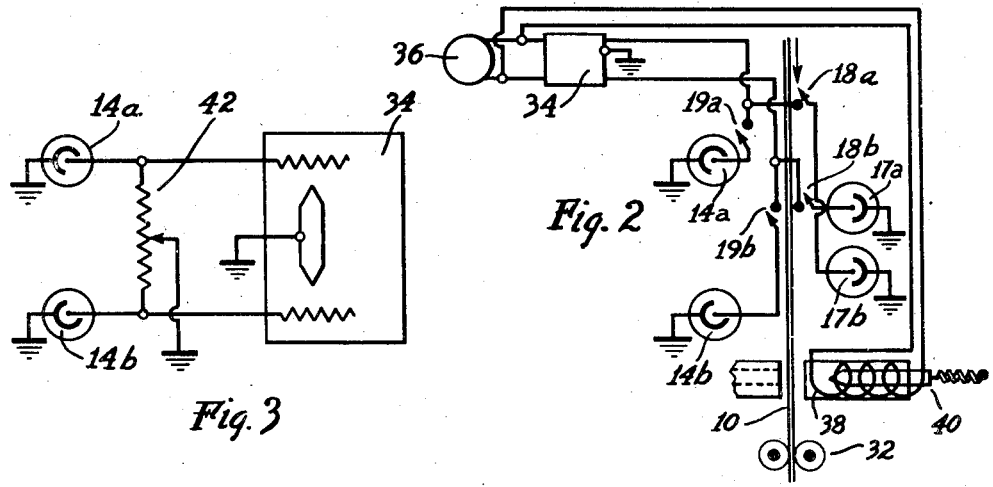
Inventor
Lawrence T. Sachtleben
By
Attorney Patented Oct. 21, 1947

2,429,331

UNITED STATES PATENT OFFICE 2,429,331

PHOTOELECTRIC APPARATUS FOR INSPECTION OF PAPER STRIPS

Lawrence T. Sachtleben, Indianapolis, Ind., assignor to Radio Corporation of America, a corporation of Delaware Application December 8, 1943, Serial No. 513,454

4 Claims. (Cl. 88—14)

This invention relates to inspection apparatus and more particularly, to such apparatus in which photo-electric devices are used.

It is often desirable in inspection apparatus to use pairs of photo-electric cells or other photo-electric devices connected in push-pull. This form of circuit has the advantage that undesired signals, due to random movement of electrons and shot effect may be made lower than in other circuits. Also, undesired variations in light source intensity and ambient light changes may be cancelled out in such a circuit without affecting deleteriously the desired light variations. Accordingly, the useful threshold signal level of an inspection system using such a circuit is correspondingly lower. There is the danger, however, with a push-pull circuit that the desired signals generated in a pair of cells may cancel each other out.

It is, therefore, the primary object of this invention to provide an optical system for use with pairs of photo-electric devices connected in a push-pull circuit, in which the danger of mutual neutralization of the desired signals generated in such devices is eliminated. It is a further object of the invention to provide an improved and practical apparatus for photo-electric inspection of materials. A further object of the invention is to provide for continuous inspection of material, by apparatus compact in construction and efficient in design.

A further object of the invention is to provide for the excitation of photo-electric devices in the inspection of material by light both reflected from and transmitted through such material.

In accordance with the invention, these objects are achieved by the provision of an optical system of lenses and prisms, in which light from a light source is divided into two substantially equal components closely spaced about the inspection point. Light from one of these components is directed at the surface to be inspected and passes from there to one of the two photo-electric cells, while light from the other component is similarly directed to the other photo-cell. Means are provided for moving the surface to be inspected relatively to the light, so that signals will be generated first in one of the devices of the pair and then in the other of said devices. The light may be reflected or transmitted with respect to the material under test. The danger of mutual neutralization or cancellation of the desired signals is, therefore, entirely eliminated.

It is to be understood that wherever the term "light" is used in this specification and the appended claims, there is meant not only light visible to the human eye, but also all forms of radiant energy capable of influencing photo-electric devices, and including (but without prejudice to the generality of the foregoing) ultra-violet radiations, X-rays and so much of the radiations within the infra-red spectrum as may be able to affect photo-electric devices; and ancillary terms such as "beam," "ray," and "image" are to have corresponding meanings.

For purposes of illustration, a more detailed description of two preferred embodiments of the invention follows. These embodiments are for the inspection of a continuous paper strip, for the detection therein of what are known in the paper industry as "slime spots." These spots are of such a nature as to reflect and/or transmit a different amount of light from the amount of light transmitted by or reflected from paper free from such imperfections.

The invention will be better understood by a reference to the accompanying drawing, in which:

Fig. 1 is a view in elevation but partly schematic of a preferred embodiment of the invention, Fig. 2 is a diagram showing how the photocells are connected to the remainder of the circuit, and Fig. 3 is a schematic diagram of a portion of an alternative circuit.

In the drawing, a source of light 2 is represented as a single coil filament of a 10 volt 7.5 ampere recording lamp 3. Light from this source passes to a positive meniscus spherical condensing lens 4 and then to a double convex spherical condensing lens 6; these lenses convert the light into a parallel beam directed at the double convex cylindrical condensing lens 8, which would, but for the interposition of further apparatus, converge such light at point P on the paper 10, and would form there a line image of the source of light. The same result may be obtained by substituting for cylindrical condensing lens 8, two cylindrical lenses similar in design to spherical lenses 4 and 6.

A pair of prisms 12a—12b are interposed between lens 8 and the paper, and these divide the light into two equal components which cast line images of the source of light on the material to be tested, for example paper, at points A and B. A pair of photoelectric cells 14a—14b connected in push-pull are placed so that light from points A and B is reflected to them. The septum 16 (which may be of any opaque material) is placed between the prisms and the paper, and is of such length as to prevent light from point A passing to the neighboring cell 14b and, at the same time, to prevent light from point B passing to the other neighboring cell 14a. It may extend close to the paper; for example, one-eighth inch is a suitable spacing.

The paper is moved in the direction of the arrow, for example, by means of suitably driven rollers 32. The movement, and therefore the inspection, of the paper may be continuous or intermittent. The cells and their associated circuits are so biased or conditioned that no output signals are generated by light passing thereto from the surface of the paper in its desired condition. If, however, there is a slime spot on the paper, as such spot reaches point A, a signal will be generated in cell 14a. The same slime spot will reach point B at some small interval of time later and will then generate a signal in cell 14b. It will be seen, therefore, that a change of light due to a defect in the paper generates sequential signals in each of the cells, so that such signals cannot cancel each other out. Even when the defects are extensive, the signals generated in each of the cells will not be in phase, and therefore cannot neutralize each other.

In the preferred embodiment, the three lenses and the prisms are of spectacle crown glass having an index of refraction of 1.523, and all of them may have surfaces of spectacle lens quality. The paper strips to be inspected are 3¼" wide, and the lenses are each centered and edged 3½" square. Spherical lens 4 has a center thickness of .870"; its surface 18 is concave, having a radius of curvature of 14.786", and its surface 20 is convex having a radius of curvature of 3.884". Spherical lens 6 has a center thickness of .775"; both its surfaces are convex, surface 22 having a radius of curvature of 22.054" and surface 24 of 6.965". Cylindrical lens 8 has a center thickness of 0.800"; both its surfaces are convex, surface 26 having a radius of curvature of 3.604" and surface 28 of 11.647".

In order to obtain uniform illumination of the line images of the source of light on the material to be inspected, it is desirable that all three lenses should be edged square; that is to say, they should be of square outline when viewed along the line of the axis of the whole optical system. It is further desirable, in order to minimize the effects of spherical aberration in the images produced by these square lenses, that the two spherical lenses should refract the marginal or edge rays from the source, equally at each of their four surfaces, while the cylindrical lens should refract the light equally at its two surfaces at a zone of the lens, whose distance from the axis is equal to the square root of three-fourths of the corresponding distance to the edge ray. For the considerations prompting such an arrangement, reference is made to an article by this applicant, entitled "A one ray system for designing spherical condensers," published in the Journal of the Society of Motion Picture Engineers for December, 1942, at page 358.

The prisms 12a—12b may be isosceles or right angled and in the preferred embodiment have a power of 12 prism diopters. The width of the thin edge of each prism is ⅛"; the height of each prism (between the thin and thick edges) is 1⅝" and its length (of the thin and thick edges) is 3½".

In the embodiment described, the prisms are designed to separate the two line images at points A and B by approximately 1 inch. This is achieved by setting the 12 diopter prisms at a distance of about 1/16" from the last surface 28 of lens 8. To decrease this separation, the prisms may be moved nearer to the paper, but retaining them at an angle of inclination of 69°30′, to the axis of the optical system, at which angle the beam through each prism is refracted with nearly minimum deviation.

The relative distances of the various parts of the inspection system are shown in the accompanying drawing. The invention is not, however, limited to these distances. By way of example, the distance of 4.480" from the last surface 28 of lens 8 to the paper strip produces satisfactory images at points A and B. However, under different conditions, different distances may produce more satisfactory results.

The drawing shows the approximate position of the cells when light is to be reflected to them from the surface to be inspected. However, in the case of translucent material, such as paper, light may reach the cells by transmission through such material. In that event, the cells will be similarly located on the opposite side of the material to be inspected, as at 17a and 17b, but may lie closer to the axis of the system. A septum 15 must be also provided between the cells in this case, for the same reason as above. More than one pair of cells may be employed, utilizing both reflected and transmitted light. In this case, cells 17a and 14b will be connected in parallel, and cells 17b and 14a will be connected in parallel. This is necessary since a transparent spot in the paper will transmit more light from A to cell 17a at the expense of less light being reflected to cell 14a. The actions of the two cells on opposite sides of the paper are thus opposed in phase, and these opposite cells must, therefore, be in push-pull connection.

Switches 18a and 18b, and 19a and 19b enable either or both pairs of cells to be included in the circuit.

It is not essential that the prisms should divide the light equally, but it is desirable that the outputs of the photo-cells should be equal. One method of effecting this is shown in Fig. 3, where the potentiometer 42 is adustable to equalize the outputs of the cells.

Light directed at the material to be inspected may be divided by means other than the prisms 12a—12b, or two beams of light may be employed.

For maximum efficiency, it is desirable that the two line images should be no wider than the diameter of the smallest defect it is desired to detect.

With many materials, sufficient light will pass to the cells by diffuse reflection to activate such cells. With shiny materials, however, it is desirable to make the angles of incidence and reflection equal. This may be effected by positioning small prisms adjacent to points A and B, so as to bend the light sharply before striking the material to be inspected. If this method is adopted, and cells are to be activated by light passing through the material, as well as by light reflected from it, the cells to be activated by transmitted light (17a—17b in Fig. 1) should be spaced further apart sufficiently to receive such transmitted light.

The whole inspection system is very compact and may be contained in a housing 30 approximately 3½" square and 12" long.

When defective paper arrives at the inspection station, current will flow from the cells and this current, after passing through the amplifier 34, may be utilized to arrest the means moving the paper past the inspection station, or to sound an alarm, or to operate a tripper relay which will in turn cause the defective portion to be cut out, in manner well known to those skilled in the art.

In the preferred embodiment, the amplified current is shown by the indicator 36, and may be used to actuate the solenoid 38, to cause the plunger 40 to perforate, and thus to mark, the defective portion. This plunger should be positioned adjacent to the inspection station, so as to make a perforation close to the slime spot.

While I have described a system for the inspection of sheet material, the invention itself has many other applications, the essential condition being that there shall be relative movement between the light actuating the photo-electric device and the agent which is to modify the quality or intensity of the light.

I claim as my invention:

1. Apparatus for detecting defects in paper, said defects being of such a character as to affect the amount of light reflected by and/or transmitted through said paper; comprising in combination, a source of light, an optical system constituted by two spherical condensing lenses situated between said source and said paper for directing a parallel beam of light from said source toward said paper and by a cylindrical condensing lens situated between said spherical lenses and said paper for converging said parallel beam on said paper, a pair of prisms so formed and so situated between said system and said paper as to divide light passing from said system to said paper into two substantially equal stationary components to form two closely-spaced stationary images of said source on said paper, means for shielding the portion of the paper upon which said images are formed from all light other than from said source and directed through said system, a pair of photo-electric devices connected in a push-pull circuit, each of said devices being associated with one only of said components, an opaque septum situated between said prisms and said paper and at right angles to said paper, and extending sufficiently away from said paper to shield each of said devices from receiving light from the component associated with the other device, means for moving said paper across said images in spaced sequence whereby portions of said paper bearing said defects cause changes in closely spaced timed sequence in the amount of light received by each of said devices and the current flowing from each of said devices is thereby changed in corresponding timed sequence, and means for utilizing the resultant change in output of said circuit for detecting said sequential variations in current.

2. Apparatus for indicating defects in material which both reflects and transmits light, the portions of said material bearing said defects having different characteristics with respect to light than the remainder of said material, including a source of light, an optical system including a pair of prisms for directing light from said source to said material to form thereon two closely spaced, stationary images of said source of substantially equal light intensity, two pairs of photoelectric devices, each pair connected in a push-pull circuit and positioned such that one pair is adapted to receive light reflected from said material while the other pair is adapted to receive light transmitted through said material, diametrically opposed members of the two pairs being connected in parallel and each of said devices in each pair being associated with a different one of said images, means for shielding the portion of material upon which said images are formed from all light other than from said source, means for shielding each of said devices from all light other than from the image associated therewith, means for moving said material across said images in spaced sequence whereby defective portions create changes in closely timed sequence in current flowing from each of said devices with respect to current flowing from another of said devices, and indicating means responsive to said sequential changes of current.

3. Apparatus for detecting defects in sheet material which both reflects and transmits light, said defects being of such a character as to affect the amount of light reflected by and/or transmitted through said material, and for indicating said defects, comprising in combination, a source of light, an optical system constituted by two spherical condensing lenses situated between said source and said material for directing a parallel beam of light from said source toward said material and by a cylindrical condensing lens situated between said spherical lenses and said material for converging said parallel beam on said material, a pair of prisms so formed and so situated between said system and said material as to divide light passing from said system to said material into two substantially equal stationary components to form two closely spaced stationary images of said source on said material, means for shielding the portion of the material upon which said images are formed from all light other than from said source and directed through said system, a pair of photo-electric devices connected in a push-pull circuit, each of said devices being associated with one only of said components, means for shielding each of said devices from all light other than from the image associated therewith, means for moving said material across said images in spaced sequence whereby defective portions create changes in closely timed sequence in current flowing from each of said devices with respect to current flowing from another of said devices, and indicating means responsive to said sequential changes of current.

4. Apparatus for detecting defects in sheet material which both reflects and transmits light, said defects being of such a character as to affect the amount of light reflected by and/or transmitted through said material, and for indicating said defects, comprising in combination, a source of light, an optical system constituted by two spherical condensing lenses situated between said source and said material for directing a parallel beam of light from said source toward said material and by a cylindrical condensing lens situated between said spherical lenses and said material for converging said parallel beam on said material, a pair of prisms so formed and so situated between said system and said material as to divide light passing from said system to said material into two substantially equal stationary components to form two closely spaced stationary images of said source on said material, means for shielding the portion of the material upon which said images are formed from all light other than from said source and directed through said system, two pairs of photo-electric devices, each pair connected in a push-pull circuit and positioned such that one pair is adapted to receive light reflected from said material while the other pair is adapted to receive light transmitted through said material, each of said devices in each pair being associated with a different one of said images and the devices associated with the same image being connected in push-pull, means for shielding each of said devices from all light other than from the image associated therewith, means for moving said material across said images in spaced sequence whereby deflective portions create changes in closely timed sequence in current flowing from each of said devices with respect to current flowing from another of said devices and indicating means responsive to said sequential changes of current.

LAWRENCE T. SACHTLEBEN.

REFERENCES CITED

The following references are of record in the file of this patent:

UNITED STATES PATENTS

| Number | Name | Date |
|---|---|---|
| 2,142,378 | Sachtleben | Jan. 3, 1939 |
| 2,248,548 | Schlesinger | July 8, 1941 |
| 2,229,125 | Pray | Jan. 21, 1941 |
| 2,173,164 | Hansell | Sept. 19, 1939 |
| 2,016,036 | FitzGerald | Oct. 1, 1935 |
| 1,979,722 | Zworykin | Nov. 6, 1934 |
| 2,246,906 | Viebahn et al. | June 24, 1941 |
| 2,047,221 | Pechy | July 14, 1936 |